Aug. 10, 1926.  
J. B. McCLAIN  
1,595,205  
CHUCK  
Filed May 17, 1924
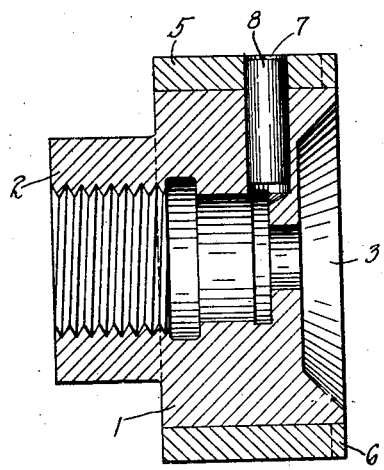
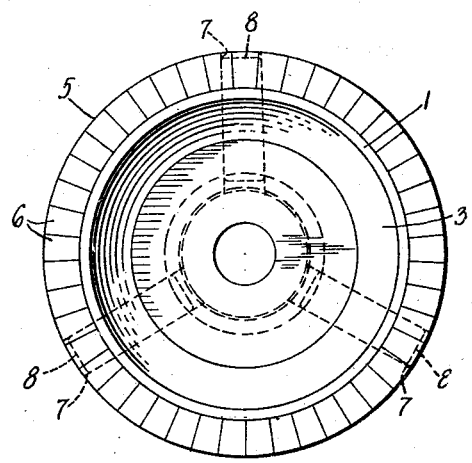
Fig.2.   Fig.3.
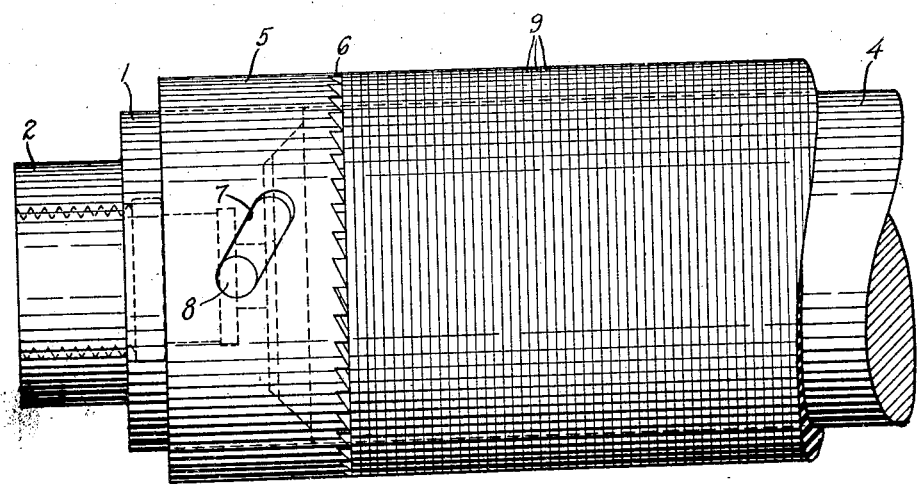
Fig.1.
Inventor  
JESSE B. McCLAIN  
By his Attorney Patented Aug. 10, 1926.

1,595,205

UNITED STATES PATENT OFFICE.

JESSE B. McCLAIN, OF PALMYRA, NEW YORK, ASSIGNOR TO THE MECHANICAL RUBBER COMPANY, OF CLEVELAND, OHIO, A CORPORATION OF NEW JERSEY.

CHUCK.

Application filed May 17, 1924. Serial No. 713,961.

This invention relates to a chuck, more particularly to a chuck for holding the tube carrying mandrels of jar ring cutting machines.

In the manufacture of rings of various materials and for various purposes they are frequently formed by making a series of transverse cuts in a tube of the desired material, and in the manufacture of rubber rings for preserve jars this method is used. After forming a tube of a suitable vulcanizable compound and vulcanizing the same, the tube is cut into appropriate lengths and each piece disposed on a suitable mandrel, usually by the aid of compressed air. One of these mandrels is then secured in the head and tail stocks of a suitable cutting machine and rotated while a cutter on a travelling carriage is pressed against the tube at regular intervals to cut it into rings. As the cutter is of appreciable thickness it tends to force each cut ring slightly to one side as it enters the material during the cutting operation, since the frictional contact of the tube with the mandrel is sufficient at first to prevent the tube from moving axially by reason of the lateral pressure of the cutter. However, after a large number of rings have been cut from the tube and the cutter is approaching the end of the tube the frictional contact with the mandrel of the portion remaining is not sufficient to prevent it from moving axially on the mandrel during a cutting operation. If this lateral movement of the tube end is not prevented it will result in uneven cutting of a portion of each tube and the formation of rings of uneven thickness.

An object of my invention is to provide an improved chuck for jar ring cutting and similar machines.

Another object is to provide a chuck by which end motion of a tube on its mandrel is prevented during the operation of cutting the tube into rings.

For a detailed disclosure of the nature and objects of the invention reference is had to the accompanying specification and drawing, in which latter:—

Figure 1 is a front view of the chuck showing it as applied to a mandrel carrying a series of cut jar rings.

Figure 2 is a longitudinal section through the chuck, and

Figure 3 is a front elevation of the chuck.

Referring to the drawing the numeral 1 designates the body of the chuck, which is of cylindrical shape and provided at its rear end with a threaded extension 2 for connection with the head stock of a jar ring cutting machine, but it is obvious, however, that any other form of connection may be used. At its front end the chuck body is provided with a frusto-conical recess 3 adapted to receive the correspondingly shaped end of the mandrel 4. Disposed around the body 1 and axially and circumferentially movable thereon is a sleeve 5 provided at its forward edge with teeth 6. Around its circumference the sleeve is provided with a series of cam slots 7, in the present instance three in number, into which slots project pins 8 carried by the chuck body.

In operation the mandrel 4 carrying the uncut rubber tube is disposed between the chuck 1 on the head stock of the machine and the tail stock, which latter may be of any suitable form, and the head stock and mandrel are then rapidly rotated while a suitable form of travelling cutter is intermittently pressed against the tube to cut it into rings. As the chuck is first rapidly rotated the sleeve 5, due to its inertia, tends to remain stationary and later to drag behind the chuck 1. Hence the pins 8 move downwardly in the inclined cam slots 7, with the result that the sleeve 5 is moved axially to the right as shown in Figure 1, causing the teeth 6 to bear against the end of the rubber tube being cut. It will be seen that as the successive rings 9 are cut from the tube in the movement of the cutter, from right to left in the present instance, the successive rings will be forced slightly to the right by the wedging action of the cutter, and as the cutter approaches the left hand end the small remaining uncut portion of the tube would tend to move to the left under this wedging action, but by reason of the engagement of the teeth 6 with the end of the tube such action is prevented, and as a result the tube is cut into rings which are of uniform thickness from one end of the tube to the other.

While the chuck is particularly designed for use in jar ring cutting machines, it is obvious that it is not so limited and may be applied to machines for cutting rings for other purposes and from other materials than rubber.

While a specific embodiment of the invention has been shown and described it is evident that with the present disclosure modifications will suggest themselves to those skilled in the art, and it is not desired to limit the invention otherwise than as set forth in the appended claims.

Having thus described my invention what I claim and desire to protect by Letters Patent is:

1. A chuck for tube carrying mandrels of ring cutting machines, comprising a body provided with an opening adapted to receive the end of a tube carrying mandrel, and means carried by said body adapted to automatically engage the tube end to prevent movement of the latter during the ring cutting operation.

2. A chuck for tube carrying mandrels comprising a body having an opening adapted to receive the end of a tube carrying mandrel, and means movable relatively to said body for engagement with the tube during rotation of the chuck and mandrel.

3. A chuck for tube carrying mandrels comprising a body provided with mandrel holding means, a sleeve loosely mounted on said body, and a connection between said sleeve and body operable upon rotation of the latter to move said sleeve into contact with the tube end.

4. A chuck for tube carrying mandrels comprising a body provided with mandrel holding means, a sleeve loosely mounted on said body and provided with a toothed forward edge, and a cam connection between said sleeve and body operable upon rotation of the latter to move said sleeve into position with its toothed edge in contact with the tube end.

5. A chuck for tube carrying mandrels comprising a body provided with mandrel holding means, a sleeve slidable axially and circumferentially on said body and provided with a toothed forward edge, said sleeve having an inclined slot therein, and a pin on said body projecting into said slot.

6. A chuck for tube carrying mandrels comprising a body provided with a frusto-conical mandrel receiving recess, a sleeve slidable axially and circumferentially on said body and provided with a toothed edge at its end adjacent said recess, said sleeve having a series of inclined slots disposed around its circumference, and a series of pins on said body projecting into said slots.

Signed at Newark, county of Wayne, State of New York, this 9 day of May, 1924.

JESSE B. McCLAIN.